(12) United States Patent
Kawamoto et al.

(10) Patent No.: US 8,765,293 B2
(45) Date of Patent: Jul. 1, 2014

(54) ELECTRIC STORAGE DEVICE

(75) Inventors: Hajime Kawamoto, Osaka (JP); Masakazu Tsutsumi, Kyoto (JP); Jun Nakamura, Kyoto (JP)

(73) Assignee: GS Yuasa International Ltd., Kyoto-Shi, Kyoto (JP)

( * ) Notice: Subject to any disclaimer, the term of this patent is extended or adjusted under 35 U.S.C. 154(b) by 172 days.

(21) Appl. No.: 13/336,954

(22) Filed: Dec. 23, 2011

(65) Prior Publication Data

US 2012/0164522 A1 Jun. 28, 2012

(30) Foreign Application Priority Data

Dec. 28, 2010 (JP) ................................. 2010-293130

(51) Int. Cl.
*H01M 2/30* (2006.01)

(52) U.S. Cl.
USPC ........................................................ 429/179

(58) Field of Classification Search
None
See application file for complete search history.

(56) References Cited

U.S. PATENT DOCUMENTS

| | | | |
|---|---|---|---|
| 3,548,264 A | 12/1970 | Carino et al. | |
| 3,680,203 A | 8/1972 | Braiman et al. | |
| 3,686,538 A | 8/1972 | Webster | |
| 4,045,862 A | 9/1977 | Evans | |
| 4,074,417 A | 2/1978 | Pearce et al. | |
| 5,849,431 A | 12/1998 | Kita et al. | |
| 6,190,798 B1 | 2/2001 | Okada et al. | |
| 2004/0023108 A1 | 2/2004 | Nakanishi et al. | |
| 2006/0003222 A1 | 1/2006 | Mushiga et al. | |
| 2006/0051664 A1 | 3/2006 | Tasai et al. | |
| 2008/0131760 A1 | 6/2008 | Yamagami et al. | |
| 2008/0220316 A1* | 9/2008 | Berkowitz et al. | 429/56 |
| 2009/0169989 A1 | 7/2009 | Morikawa et al. | |
| 2010/0021811 A1 | 1/2010 | Kado et al. | |
| 2010/0047686 A1* | 2/2010 | Tsuchiya et al. | 429/178 |
| 2010/0081048 A1 | 4/2010 | Nansaka et al. | |
| 2010/0092858 A1 | 4/2010 | Takashiro et al. | |
| 2010/0129709 A1 | 5/2010 | Matsubara | |
| 2010/0173178 A1 | 7/2010 | Kim et al. | |
| 2012/0264001 A1 | 10/2012 | Tsuchiya et al. | |

(Continued)

FOREIGN PATENT DOCUMENTS

| | | |
|---|---|---|
| GB | 2 154 049 A | 8/1985 |
| JP | 59-58754 A | 4/1984 |

(Continued)

OTHER PUBLICATIONS

Specification (pp. 1-33 and Drawings (Figs. 1-7) of related co-pending U.S. Appl. No. 13/087,146.

(Continued)

*Primary Examiner* — Patrick Ryan
*Assistant Examiner* — Christopher Domone
(74) *Attorney, Agent, or Firm* — McGinn IP Law Group, PLLC

(57) ABSTRACT

Provided is an electric storage device that can ensure seal in a peripheral area of a portion in a defining wall of a case through which a rivet passes even when a rivet is inserted through the defining wall of the case and the rivet is caulked. The electric storage device includes: an electrode assembly; a case that houses the electrode assembly, the case including a defining wall; and a rivet, wherein a peripheral area of a portion in the defining wall through which the rivet passes has a higher hardness than the remaining area.

19 Claims, 7 Drawing Sheets

(56) References Cited

U.S. PATENT DOCUMENTS

| | | |
|---|---|---|
| 2012/0264003 A1 | 10/2012 | Tsuchiya et al. |
| 2012/0264004 A1 | 10/2012 | Tsuchiya et al. |
| 2012/0264005 A1 | 10/2012 | Tsuchiya et al. |
| 2012/0264006 A1 | 10/2012 | Tsuchiya et al. |

FOREIGN PATENT DOCUMENTS

| | | |
|---|---|---|
| JP | 2-54162 | 4/1990 |
| JP | 8-321287 A | 12/1996 |
| JP | 10-125291 A | 5/1998 |
| JP | 11-195561 A | 7/1999 |
| JP | 2001-126684 A | 5/2001 |
| JP | 2001-357833 A | 12/2001 |
| JP | 2002-175797 A | 6/2002 |
| JP | 2002-324541 A | 11/2002 |
| JP | 2003-92103 A | 3/2003 |
| JP | 2003-323869 A | 11/2003 |
| JP | 2003-346774 A | 12/2003 |
| JP | 2003-346778 A | 12/2003 |
| JP | 2004-296447 A | 10/2004 |
| JP | 3612629 B2 | 1/2005 |
| JP | 2005-56649 A | 3/2005 |
| JP | 3708183 B2 | 10/2005 |
| JP | 2005-310569 A | 11/2005 |
| JP | 2006-19093 A | 1/2006 |
| JP | 2006-216411 A | 8/2006 |
| JP | 2007-107048 A | 4/2007 |
| JP | 3985805 B2 | 10/2007 |
| JP | 2008-27823 A | 2/2008 |
| JP | 2008-251213 A | 10/2008 |
| JP | 2009-52126 A | 3/2009 |
| JP | 2009-54531 A | 3/2009 |
| JP | 2009-259424 A | 11/2009 |
| JP | 2009-259739 A | 11/2009 |
| JP | 2009-277604 A | 11/2009 |
| JP | 2010-40533 A | 2/2010 |
| JP | 2010-97764 A | 4/2010 |
| JP | 2010-97822 A | 4/2010 |
| WO | WO 2008/016152 A1 | 2/2008 |
| WO | WO 2008/084883 A2 | 7/2008 |
| WO | WO 2009/107657 A1 | 9/2009 |

OTHER PUBLICATIONS

Specification (pp. 1-43) and Drawings (Figs. 1-8) of related co-pending U.S. Appl. No. 13/087,130.
Extended European Search Report dated Apr. 17, 2012.
U.S. Notice of Allowance dated Jul. 18, 2013, for U.S. Appl. No. 13/336,947.
Extended European Search Report dated May 7, 2012.
US Office Action for co-pending related U.S. Appl. No. 13/087,130 dated Nov. 13, 2012.
US Office Action for co-pending related U.S. Appl. No. 13/087,146 dated Nov. 13, 2012.
Specification (pp. 1-37) and Drawings (Figs. 1-9) of related co-pending U.S. Appl. No. 13/354,193.
US Office Action for co-pending related U.S. Appl. No. 13/087,130 dated Apr. 10, 2013.
US Office Action for co-pending related U.S. Appl. No. 13/087,146 dated Apr. 10, 2013.
U.S. Office Action dated Aug. 14, 2013 in U.S. Appl. No. 13/087,130.

* cited by examiner

F I G . 3
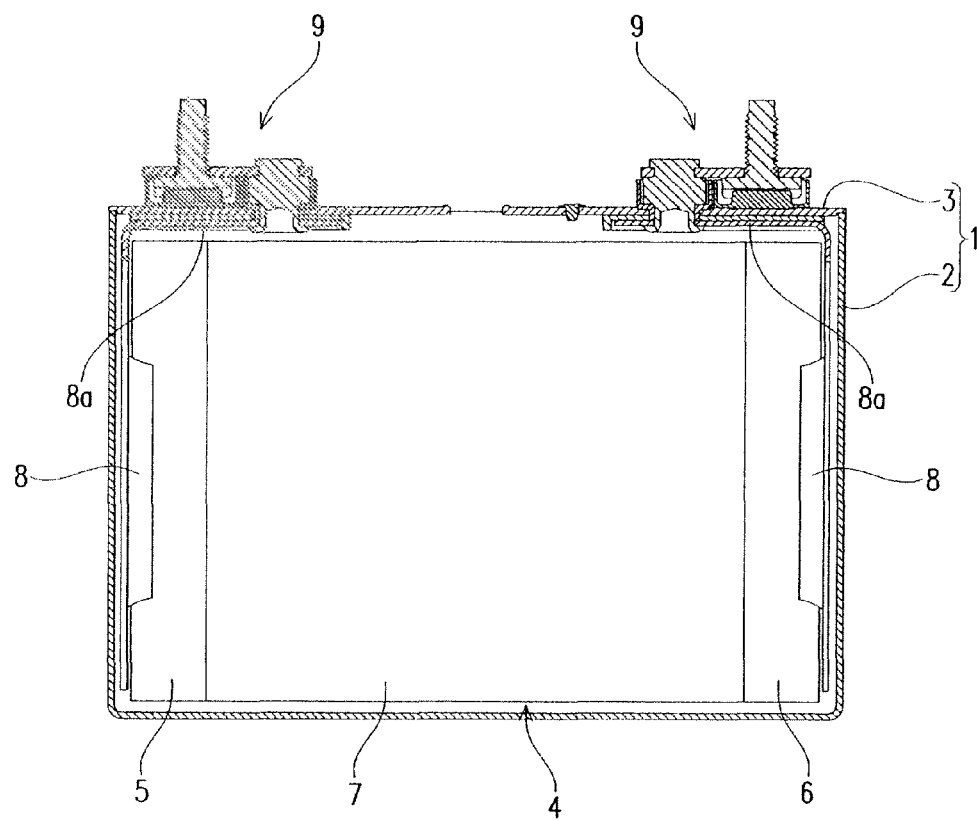

ELECTRIC STORAGE DEVICE

CROSS REFERENCE TO RELATED APPLICATION

This application claims priority from Japanese Patent Application No. 2010-293130, the disclosure of which is incorporated herein by reference in its entirety.

FIELD OF THE INVENTION

The present invention relates to an electric storage device including an electrode assembly, a case that houses the electrode assembly, and a rivet that passes through a defining wall of the case.

BACKGROUND ART

In recent years, rechargeable and dischargeable electric storage devices such as battery cells (e.g., a lithium ion battery cell and a nickel-metal hydride battery cell) and capacitors (e.g., an electric double layer capacitor) have been adopted as the power sources of vehicles (e.g., an automobile and a motorcycle) and various devices (e.g., a portable terminal and a laptop computer). For example, various types of battery cells have been provided. One of them is a battery cell that includes: an electrode assembly; a current collector that is electrically connected to the electrode assembly; a case that houses the electrode assembly and the current collector; an external terminal disposed outside the case; and a rivet that passes through the defining wall of the case, wherein the external terminal and the current collector are electrically connected to each other via the rivet.

Examples of the above type of battery cell include a battery cell in which a rivet and an external terminal are integrally formed with each other (cf., JP-A-2001-357833, for example) and a battery cell in which a rivet and an external terminal are connected with each other via a connection conductor (cf., JP-A-2010-97764, for example). Either of these battery cells has an inner insulating member arranged along the inner surface of a defining wall of the case and an outer insulating member arranged along the outer surface of the wall of the case. The rivet is inserted through the outer, insulating member, a through-hole formed in the defining wall of the case, the inner insulating member and the current collector, and then the end of the rivet is caulked.

Thus, the current collector and the electrode assembly connected to the current collector are secured to the case. The opposite ends of the rivet integrally hold the outer insulating member, the defining wall of the case, the inner insulating member and the current collector therebetween to apply a compressive force to the peripheral area of the through-hole in the defining wall. This allows the inner and outer insulating members to be brought into close contact with the defining wall, thereby providing seal between the inside and the outside of the case.

The case is made of a metal (e.g., stainless steel, an aluminum alloy and the like). Because of this, when the rivet is caulked as described above, the peripheral area of the through-hole in the defining wall of the case is compressed and tends to be elongated in a direction crossing the axis of the rivet, i.e., in a direction crossing the direction in which the compressive force acts.

This can result in a distortion and thinning of the peripheral area of the through-hole in the defining wall of the case. This in turn could decrease the degree of contact of the inner and outer insulating members with the peripheral area of the through-hole (the degree of seal of the cell case).

In particular, when the case is made of an aluminum alloy to reduce the weight of the cell, elongation of the defining wall caused by caulking of the rivet is significant because of the softness of an aluminum alloy compared to steel such as stainless steel. If this occurs, the seal of the cell case is greatly reduced.

Meanwhile, when the rivet is used for an electrical connection between the defining wall of the case and the electrode assembly, insulation is not necessary between the defining wall and the rivet, and therefore inner and outer insulating members are unnecessary. Even in this case, however, when the rivet has been caulked, the peripheral area of the through-hole in the defining wall may be compressed causing distortion and thinning, which could in turn result in decreased seal of the case.

This problem is not limited to battery cells, but also occurs with capacitors (e.g., a double layer capacitor and the like) as well.

SUMMARY OF THE INVENTION

An object of the present invention is to provide an electric storage device that can ensure seal in a peripheral area of a portion in a defining wall through which a rivet passes even when a rivet is inserted through the defining wall of the case and the rivet is caulked.

An electric storage device according to the present invention includes:
an electrode assembly;
a case that houses the electrode assembly, the case including a defining wall; and
a rivet that passes through the defining wall,
wherein a peripheral area of a portion in the defining wall through which the rivet passes has a higher hardness than the remaining area.

In this case, the electric storage device may have a configuration in which;
the case includes a defining wall having a through-hole in a portion thereof;
the rivet passes through the defining wall via the through-hole; and
the peripheral area of the through-hole in the defining wall has a higher hardness than the remaining area.

In one embodiment of the present invention, the electric storage device may have a configuration in which the device further includes;
an insulating member disposed along the defining wall, the insulating member having a joining surface that faces the defining wall, so that the rivet passes through the insulating member and the defining wall,
wherein the defining wall has a recess into which at least a portion of the joining surface of the insulating member is fittable.

In this case, the electric storage device may have a configuration in which the device includes:
an insulating member disposed along the defining wall, and having a through-hole that corresponds in position to the through-hole of the defining wall and a joining surface that faces the defining wall with the two through-holes aligned with each other, so that the rivet passes through the insulating member and the defining wall via the two through-holes,
wherein the defining wall has a recess into which at least a portion of the joining surface of the insulating member is fittable.

In this case, the insulating member may comprise synthetic resin.

The insulating member may be disposed on an outer surface of the defining wall and support the rivet.

In another embodiment of the present invention, the electric storage device may have a configuration in which the device includes:

an outer insulating member disposed on an outer surface of the defining wall, the outer insulating member having a joining surface that faces the outer surface of the defining wall; and an inner insulating member disposed on an inner surface of the defining wall, the inner insulating member having a joining surface that faces the inner surface of the defining wall, so that the rivet passes through the outer insulating member, the defining wall and the inner, insulating member, wherein the defining wall has a recess into which at least a portion of the joining surface of at least one of the outer and inner insulating members is fittable.

In this case, the electric storage device may have a configuration in which the device includes:

an outer insulating member disposed on an outer surface of the defining wall, the outer insulating member having a through-hole that corresponds in position to the through-hole of the defining wall and a joining surface that faces the outer surface of the defining wall with the two through-holes aligned with each other; and an inner insulating member disposed on an inner surface of the defining wall, the inner insulating member having a through-hole that corresponds in position to the through-hole of the defining wall and a joining surface that faces the inner surface of the defining wall with the two through-holes aligned with each other, so that the rivet passes through the outer insulating member, the defining wall and the inner insulating member via the three through-holes, wherein the defining wall has a recess into which at least a portion of the joining surface of at least one of the outer and inner insulating members is fittable.

In still another embodiment of the present invention, the electric storage device may have a configuration in which the peripheral area of the portion in the defining wall through which the rivet passes is compression formed in the thickness direction of the defining wall an as to have a higher hardness than the remaining area.

In yet another embodiment of the present invention, the electric storage device may have a configuration in which the defining wall comprises an annealed aluminum alloy.

In another embodiment of the present invention, the electric storage device may have a configuration in which the device further includes:

a terminal retainer disposed on the outer surface of the defining wall, the terminal retainer having a joining surface that faces the outer surface of the defining wall; and an external terminal that is supported by the terminal retainer and electrically connected to the rivet, wherein the defining wall has a recess into which at least a portion of the joining surface of the terminal retainer is fittable.

In this case, the insulating member and the terminal retainer may be disposed proximate to each other.

In still another embodiment of the present invention, the electric storage device may have a configuration in which:

the case includes a case body having an opening and a cover plate that covers and seals the opening of the case body, and the rivet passes through the cover plate that constitutes a part of the defining wall of the case.

In this case, the case body may have a rectangular box shape that is flat in the width direction; and the cover plate may be a rectangular plate that corresponds in position to the opening of the case body.

Furthermore, in this case, the rivet may include a pair of rivets, the pair of rivets passing through the cover plate at two locations that are spaced from each other in the longitudinal direction of the cover plate.

BRIEF DESCRIPTION OF THE DRAWINGS

FIG. 3 is a cross-sectional view taken along line A-A in FIG. 1;

DETAILED DESCRIPTION OF THE PREFERRED EMBODIMENTS

Figure 1:
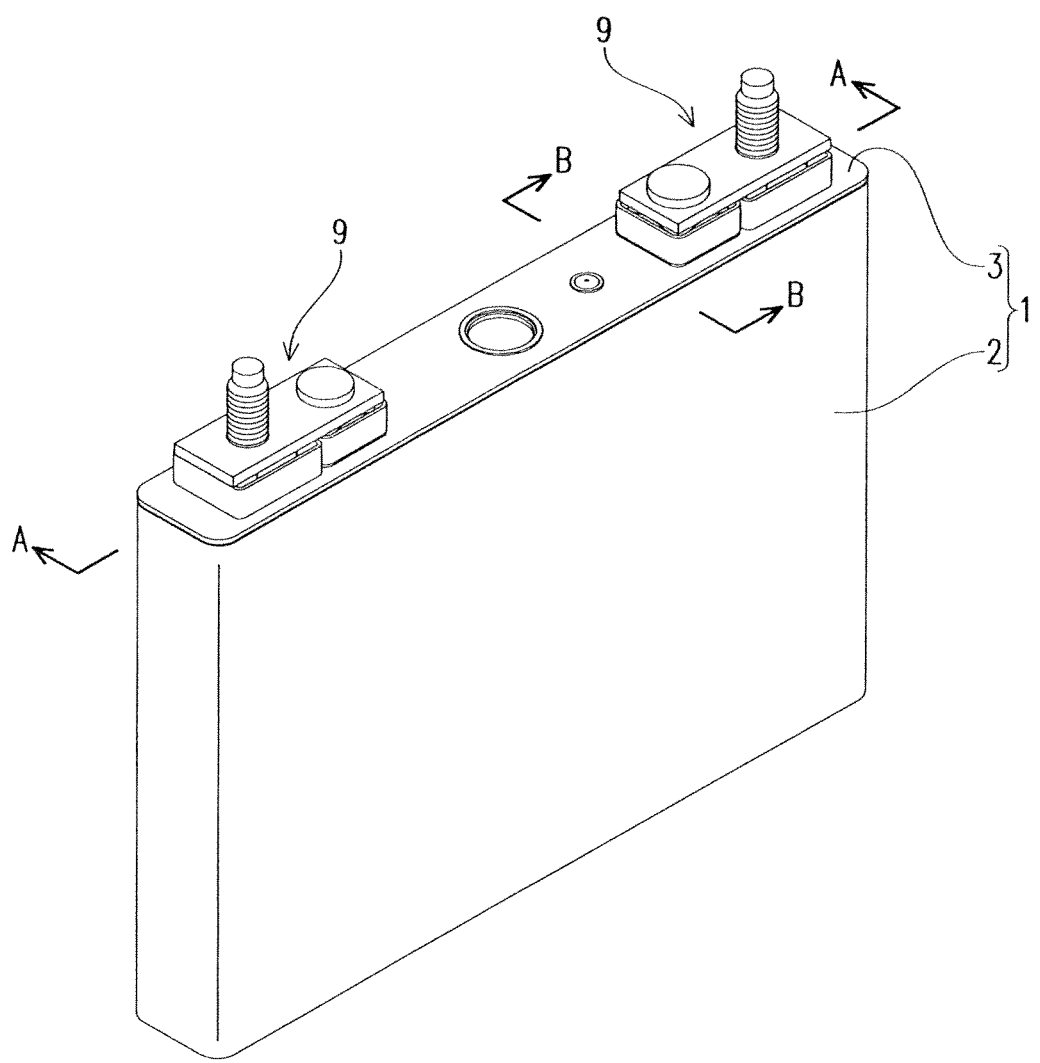
FIG. 1 is a perspective view of a battery cell according to an embodiment of the present invention.
Figure 2:
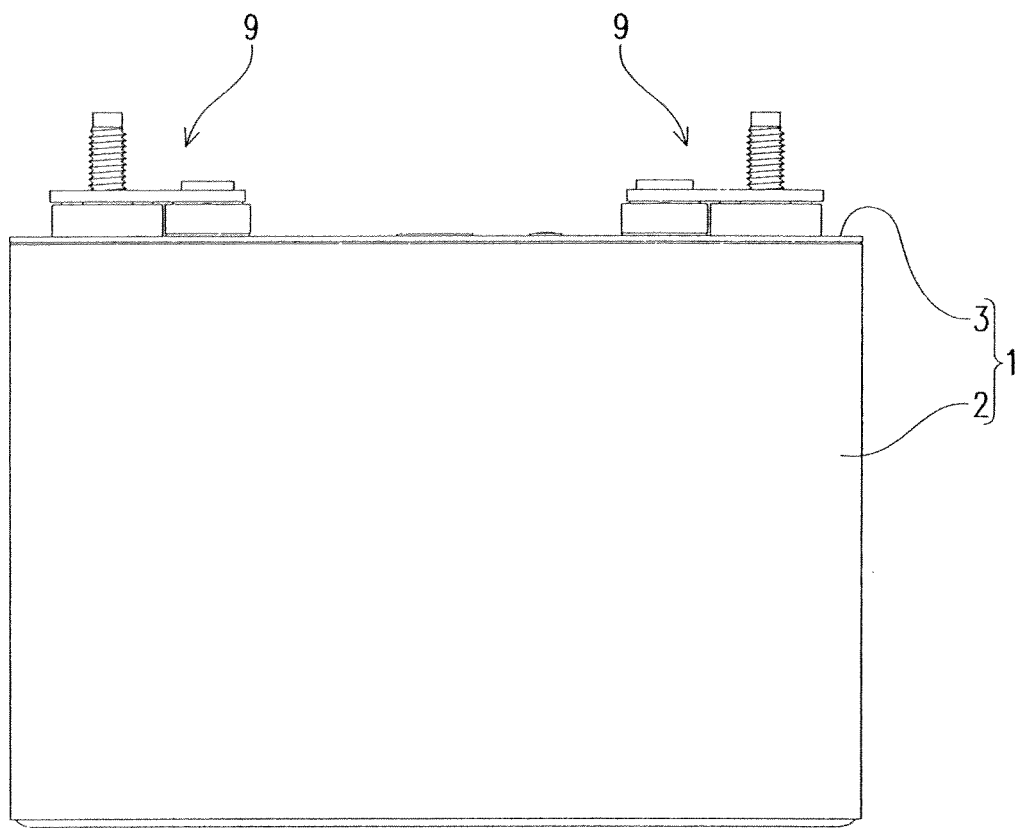
FIG. 2 is a side view of the battery cell.
Figure 4:
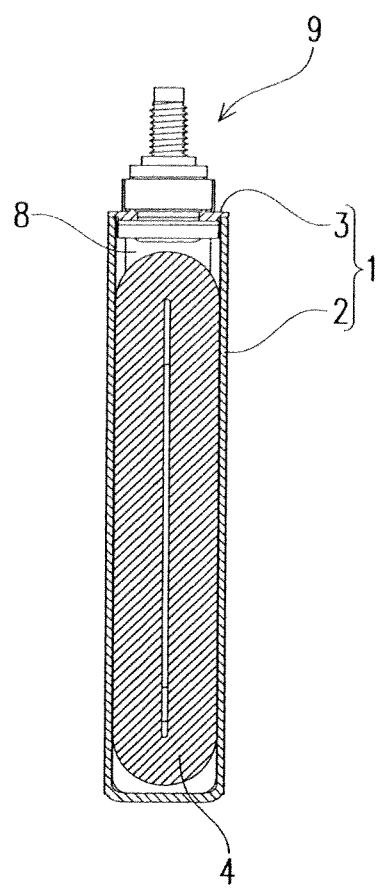
FIG. 4 is a cross-sectional view taken along line B-B in FIG. 1.

A battery cell which is an embodiment of an electric storage device according to the present invention will be described below with reference to the drawings. A battery cell according to the present embodiment is a non-aqueous electrolyte secondary battery cell and, more particularly, a lithium ion secondary battery cell. As shown in FIGS. 1 to 4, the battery cell according to the present embodiment includes a case 1 which is composed of a case body 2 and a cover plate 3 which covers an opening of the case body 2 to seal the case 1. The cover plate 3 includes terminal structures 9 which are electrically connected to an electrode assembly 4 housed in the case 1.

The case body 2 and the cover plate 3 are made of a metal such as an aluminum alloy, a stainless alloy and the like. In this embodiment, the case body 2 and the cover plate 3 are made of an aluminum alloy. The adopted aluminum alloy is an annealed aluminum alloy (O-temper material). The case body 2 has a rectangular box shape that is flat in the width direction, so that it houses a winding type electrode assembly 4 that has been formed into an elliptic cylinder. The cover plate 3 is a rectangular plate that corresponds in position to the opening of the case body 2.

Figure 5:
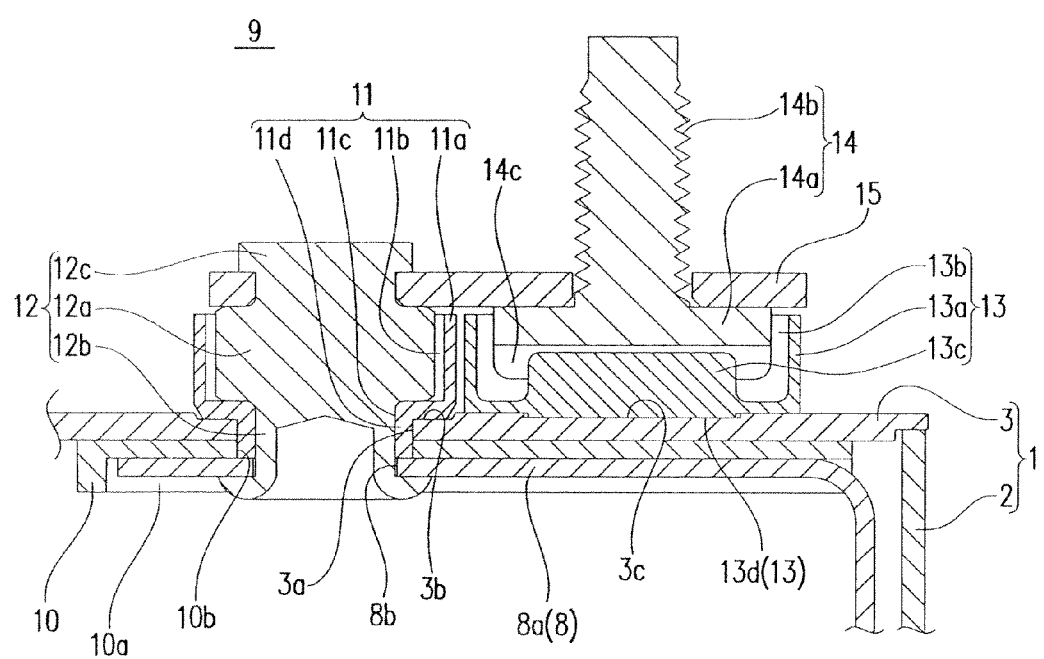
FIG. 5 is an enlarged cross-sectional view of a terminal part of the battery cell.
Figure 6:
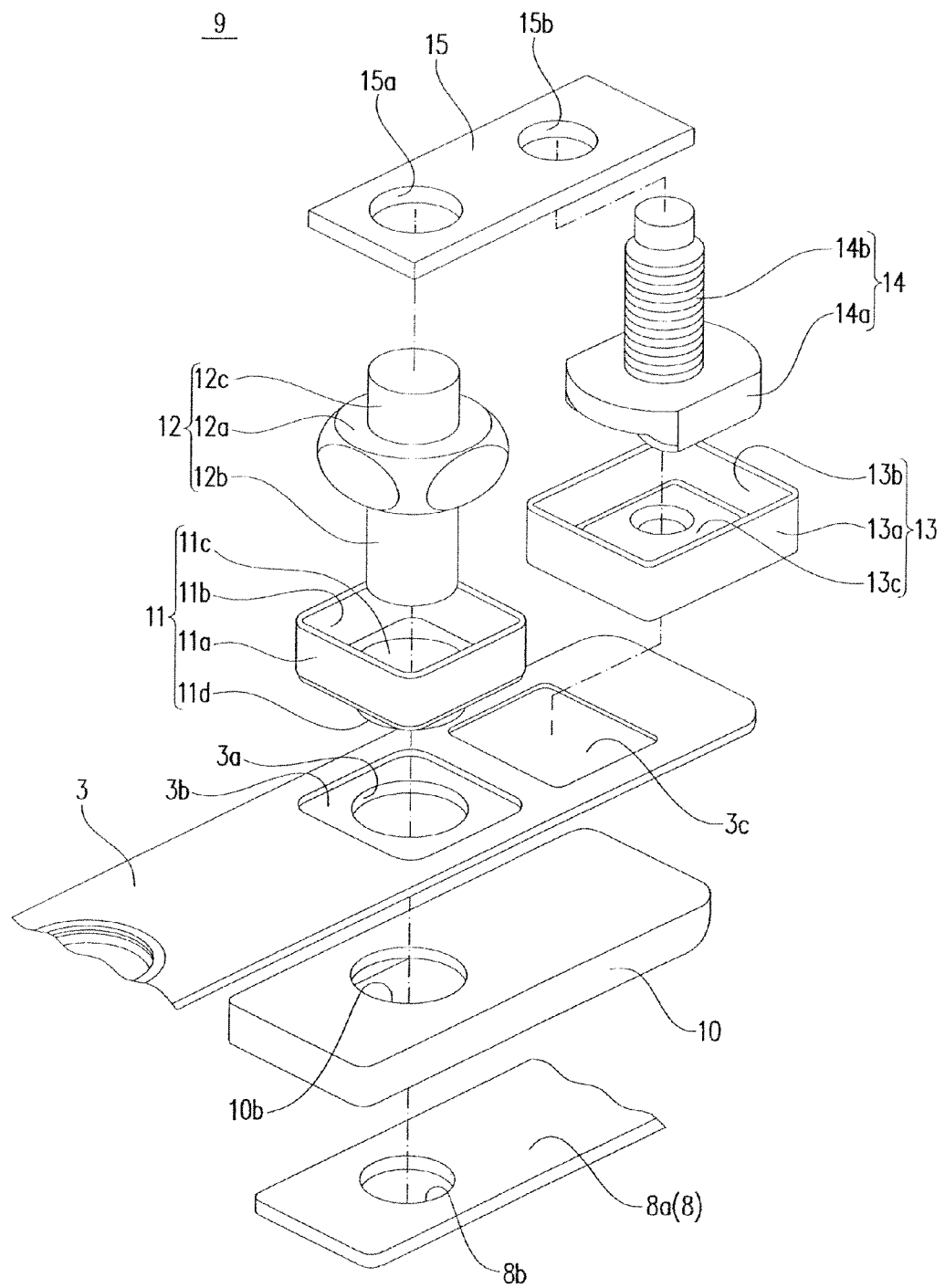
FIG. 6 is an exploded perspective view of the terminal part as seen from above.
Figure 7:
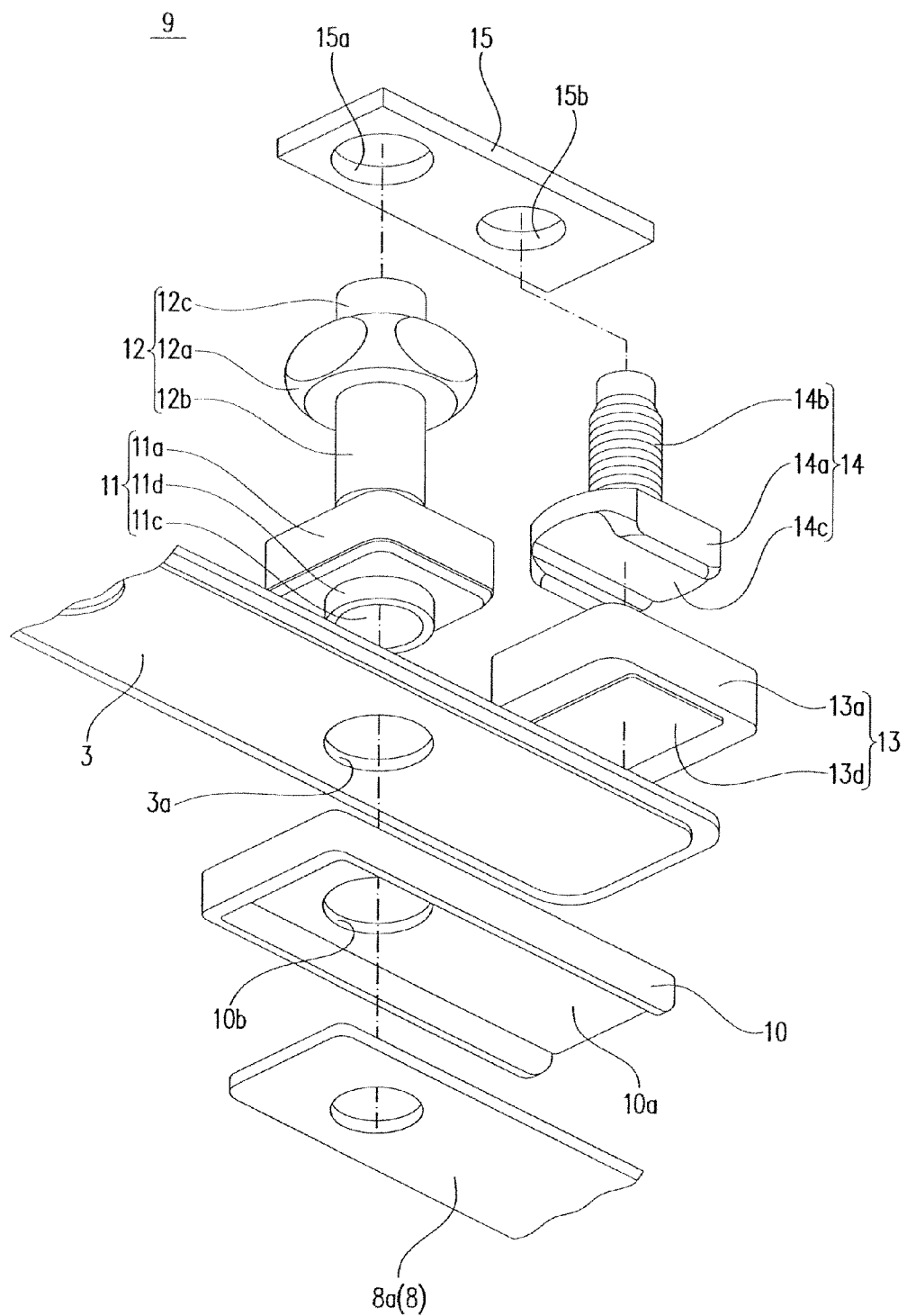
FIG. 7 is an exploded perspective view of the terminal part as seen from below.

As shown in FIGS. 5-7, the cover plate 3 has two through-holes 3a, which are spaced from each other in the longitudinal direction, each designed for insertion of a later described rivet 12. The peripheral area of each through-hole 3a is compression formed in the thickness direction by coining, for example. This makes the peripheral area of each through-hole 3a thinner than the remaining area. The compression forming of the peripheral area of each through-hole 3a causes work hardening of the peripheral area of each through-hole 3a, which results in an increase in stiffness.

The peripheral areas of the through-holes 3a are made thinner by compression forming, and the cover plate 3 is therefore provided with recesses (first recesses) 3b in the outer surface, into which outer gaskets 11 can be fitted.

To provide the through-holes 3a, holes having a smaller diameter than that of the through-holes 3a are firstly formed to pass through locations where the through-holes 3a are supposed to be located in an aluminum alloy plate that is formed into the cover plate 3. Then, the peripheral areas of the holes are compression formed and made thinner, and then the diameter of the hole is enlarged to provide the through-holes 3a. Thus, holes having a smaller diameter are firstly formed and then the peripheral areas of the holes are compression formed, so that at the time of the compression forming, portions that cannot be fully compressed escape toward the small-diameter holes. Through this, both surfaces of the peripheral area of each through-hole 3a can be flat and smooth. Furthermore, when the formation of the through-holes 3a is done by enlargement of the small-diameter holes after the compression forming, portions that escaped at the time of the compression forming are removed, thereby forming the through-holes 3a into a proper shape. Returning to FIGS. 1-4, the cover plate 3 is fitted into the opening of the case body 2 and hermetically fixed by laser welding or the like.

In the electrode assembly 4, a band-shaped positive electrode sheet 5 and a band-shaped negative electrode sheet 6 which are displaced to each other in different lateral directions with a band-shaped separator 7 sandwiched therebetween are wound about a lateral rotation axis into a cylinder in the shape of a vertically long ellipse. The electrode assembly 4 is entirely covered with an insulating cover (not shown) made of an insulating sheet and is housed in the case 1 while being insulated from the case 1. The positive electrode sheet 5 includes aluminum foil carrying a positive electrode active material at the surface. The negative electrode sheet 6 includes copper foil carrying negative electrode active material at the surface. The positive electrode sheet 5 and the negative electrode sheet 6 each have a non-overlapped portion not coated with the active material at an edge in the lateral direction in which the sheet is displaced. With this arrangement, at the lateral ends of the electrode assembly 4, the aluminum foil and copper foil are exposed, and thus these metal foils of the positive electrode and negative electrode project from the overlapped portion in a wound configuration.

Metal foils projecting at the lateral ends of the electrode assembly 4 are electrically connected to respective current collectors 8. The current collectors 8 are vertically long conductive metal members. More specifically, the current collector 8 for the positive electrode is made of aluminum or an aluminum alloy and the current collector 8 for the negative electrode is made of copper or a copper alloy. An upper part of each current collector 8 is horizontally bent to constitute a connection part 8a. A part extending downward from the connection part 8a is divided into a front part and a rear part, which project downward. The two front and rear parts are sandwiched between holding plates (not shown) together with the corresponding end of the electrode assembly 4 and are connected and fixed by ultrasonic welding or the like.

The terminal structures 9 include the terminal structure 9 for the positive electrode and the terminal structure 9 for the negative electrode. As shown in more detail in FIGS. 5 to 7, each terminal structure 9 includes a plastic plate 10, an outer gasket 11, a rivet 12, a terminal retainer 13, a terminal bolt 14, and a connecting plate 15. The plastic plate 10 and outer gasket 11 are arranged inside and outside the case 1 with through-holes 3a formed in the right and left ends of the cover plate 3 interposed therebetween. The rivet 12 is inserted into the through-hole 3a via the plastic plate 10 and outer gasket 11 and is electrically connected to the connection part 8a of the current collector 8. The terminal retainer 13 is arranged close to the outer gasket 11. The terminal bolt 14 is arranged at an outer surface of the cover plate 3 via the terminal retainer 13. The connecting plate 15 electrically connects the terminal bolt 14 and the rivet 12. With this configuration, the electrode assembly 4 inside the case 1 and the terminal bolt 14 are electrically connected to each other.

Note that the plastic plate 10, outer gasket 11, and terminal retainer 13 each represent an insulating member. The outer gasket 11 (and the plastic plate 10 in some instances) has a sealing function and thus also represents an insulating sealing member. The rivet 12 represents an auxiliary terminal. The terminal bolt 14 represents an external terminal. The connecting plate 15 represents a connecting conductor.

The plastic plate 10 is a synthetic resin member with at least insulating properties. More specifically, for example, polyphenylene sulfide (PPS) resin is used as the material for the plastic plate 10. However, the material is not limited to this, and any appropriate material can be selected. The plastic plate 10 has a rectangular shape. A lower surface of the plastic plate 10 includes a recess 10a which can receive the connection part 8a of the current collector 8. The plastic plate 10 includes a through-hole 10b which coincides in position with a through-hole 8b formed in the connection part 8a while the recess 10a receives the connection part 8a of the current collector 8.

The outer gasket 11 is a synthetic resin member with insulating properties and sealing properties. More specifically, for example, polyphenylene sulfide (PPS) resin is used as the material for the plastic plate 10. However, the material is not limited to this, and any appropriate material can be selected.

The outer gasket 11 is slightly larger than a body 12a of the rivet 12 and has a rectangular shape. The outer gasket 11 includes a surrounding peripheral outer wall part 11a at the outer periphery, which is formed by recessing an upper surface except for the outer periphery. The outer gasket 11 includes a recess 11b which can receive the body 12a of the rivet 12 inside the outer wall part 11a. The outer gasket 11 includes a through-hole 11c into which a first caulking part 12b of the rivet 12 can be inserted while the recess 11b receives the body 12a of the rivet 12. A lower surface of the outer gasket 11 includes an annular projection 11d which extends through the through-hole 3a of the cover plate 3 and is inserted into the through-hole 10b of the plastic plate 10.

Note that the plastic plate 10 is arranged on a lower surface (an inner surface) of the cover plate 3 and is thus arranged inside the case 1. The outer gasket 11 is arranged at an upper surface (the outer surface) of the cover plate 3 and is thus arranged at an outer surface of the case 1. A region of the upper surface of the cover plate 3 where the outer gasket 11 is arranged includes a non-circular recess (first recess) 3b which can receive a lower part (bridge part) of the outer gasket 11. When the lower part (a to-be-bonded surface to the cover plate 3) of the outer gasket 11 is inserted into the first recess 3b, the outer gasket 11 is restrained from rotating about its axis. Note that, in the present embodiment, the first recess 3b is formed to be rectangular so as to correspond to the shape of the rectangular lower part of the outer gasket 11. The first recess 3b is formed by coining or the like.

The rivet 12 is a conductive metal member. More specifically, the rivet 12 for the positive electrode is made of aluminum or an aluminum alloy while the rivet 12 for the negative electrode is made of copper or a copper alloy. The first caulking part 12b projects downward from a lower surface of the body 12a of the rivet 12. A second caulking part 12c projects upward from an upper surface of the body 12a of the rivet 12. Note that, in the present embodiment, the first caulking part 12b is hollow (tubular) while the second caulking part 12c is solid (columnar). More specifically, the first caulking part 12b has a circular tubular shape while the second caulking part 12c has a circular columnar shape. However, the shape is not limited to this, and any appropriate shape can be selected.

The dimensional relationship among the through-hole 3a of the cover plate 3, the through-hole 8b of the connection part 8a of the current collector 8, the through-hole 10b of the plastic plate 10, the through-hole 11c and annular projection 11d of the outer gasket 11, and the first caulking part 12b of the rivet 12 will be described. As shown in detail in FIG. 5, the inner diameter of the through-hole 3a of the cover plate 3 and the inner diameter of the through-hole 10b of the plastic plate 10 are the same or substantially the same. The inner diameter of the through-hole 3a of the cover plate 3 and the inner diameter of the through-hole 10b of the plastic plate 10 are the same or substantially the same as the outer diameter of the annular projection 11d of the outer gasket 11. The length of the annular projection 11d of the outer gasket 11 is the same or substantially the same as the sum of the thicknesses of the cover plate 3 and plastic plate 10. The inner diameter of the annular projection 11d of the outer gasket 11 and the inner diameter of the through-hole 8b of the connection part 8a of the current collector 8 are the same or substantially the same. The inner diameter of the annular projection 11d of the outer gasket 11 and the inner diameter of the through-hole 8b of the connection part 8a of the current collector 8 are the same or substantially the same as the outer diameter of the first caulking part 12b of the rivet 12. The length of the first caulking part 12b of the rivet 12 is the same or substantially the same as the sum of the thicknesses of the cover plate 3, the connection part 8a of the current collector 8, the plastic plate 10, and the outer gasket 11.

Accordingly, the body 12a of the rivet 12 is inserted into the recess 11b of the outer gasket 11, the first caulking part 12b of the rivet 12 extends through the through-hole 11c at a bottom surface of the recess 11b and is inserted into the through-hole 8b of the connection part 8a of the current collector 8, and an end portion of the first caulking part 12b projecting downward from the through-hole 8b of the connection part 8a is caulked from below. With this configuration, the rivet 12 is attached to the cover plate 3 while the rivet 12 is electrically connected to the connection part 8a of the current collector 8 and is insulated from the cover plate 3.

The terminal retainer 13 is a synthetic resin member with insulating properties, like the plastic plate 10 and outer gasket 11. Note that a reinforced resin material obtained by uniformly mixing polyphenylene sulfide resin with glass fiber as a filler, for example, is used as the material for the terminal retainer 13 in order to make the hardness higher than those of the plastic plate 10 and outer gasket 11. Alternatively, polytetrafluoroethylene-perfluoroalkylvinylether copolymer (PFA) resin is used instead of polyphenylene sulfide resin. An inorganic fiber other than glass fiber may be used. However, the material is not limited to this, and any appropriate material can be selected.

The terminal retainer 13 is slightly larger than a head 14a of the terminal bolt 14 and has a rectangular shape. The terminal retainer 13 includes a surrounding peripheral outer wall part 13a at the outer periphery, which is formed by recessing an upper surface except for the outer periphery. The terminal retainer 13 includes a recess 13b which can receive the head 14a of the terminal bolt 14 inside the outer wall part 13a. The terminal retainer 13 includes a non-circular fitting projection 13c in the recess 13b. The fitting projection 13c fits in a non-circular fitting recess (fitting groove) 14c formed in the head 14a of the terminal bolt 14 while the recess 13b receives the head 14a of the terminal bolt 14. Accordingly, when the fitting projection 13c in the recess 13b (i.e., the fitting projection 13c at a lower position than an upper end surface of the outer wall part 11a in the recess 13b) fits in the fitting recess 14c of the head 14a of the terminal bolt 14, the terminal retainer 13 receives the terminal bolt 14 while the terminal bolt 14 is restrained from rotating about its axis. Note that, in the present embodiment, the fitting recess 14c of the terminal bolt 14 is formed by cutting out a part extending from one side to the opposite side and has a rectangular shape. The fitting projection 13c of the terminal retainer 13 is formed to be rectangular so as to correspond to the rectangular fitting recess 14c.

A lower surface of the terminal retainer 13 includes a non-circular projection 13d. In the present embodiment, the projection 13d is a rectangular projecting surface (raised surface). A region of the upper surface of the cover plate 3 where the terminal retainer 13 is arranged includes a non-circular recess (second recess) 3c which can receive the projection 13d of the terminal retainer 13. When the projection 13d of the terminal retainer 13 is inserted into the second recess 3c, the terminal retainer 13 is restrained from rotating about its axis, like the outer gasket 11. Note that, in the present embodiment, the second recess 3c is formed to be rectangular so as to correspond to the rectangular projection 13d. The second recess 3c is formed by coining or the like.

When the terminal retainer 13 is to be arranged on the upper surface of the cover plate 3, the lower surface (including a surface of the projection 13d) of the terminal retainer 13 is treated by appropriate means so that the glass fiber is exposed at the lower surface of the terminal retainer 13. A preferred example of the appropriate means is to mechanically cut off the lower surface of the terminal retainer 13. For example, the glass fiber is exposed by cutting the lower surface of the terminal retainer 13 with a file or the like. The projection 13d at the lower surface of the terminal retainer 13 fits in the second recess 3c at the upper surface of the cover plate 3, and the terminal retainer 13 is fixed to the upper surface of the cover plate 3. A method for fixing the terminal retainer 13 to the cover plate 3 is not particularly limited. For example, appropriate adhesive means (e.g., an adhesive film, a liquid adhesive, or a solid adhesive) may be supplied to at least one of the upper surface (in particular, the second recess 3c) of the cover plate 3 and the lower surface of the terminal retainer 13, and the terminal retainer 13 may be fixed to the cover plate 3 via the adhesive means. Although a common adhesive can be used as the adhesive, an epoxy resin adhesive may preferably be used. An epoxy resin has poor adhesion to the synthetic resin used for the terminal retainer 13 but has good adhesion to an inorganic fiber. Accordingly, the glass fiber exposed at the lower surface of the terminal retainer 13 allows the terminal retainer 13 to be firmly bonded to the cover plate 3.

The terminal bolt 14 is intended to electrically connect the battery cell to an external device. The terminal bolt 14 is a conductive metal member with high strength made of iron, steel such as stainless steel and chromium molybdenum steel, or the like. As described above, the terminal bolt 14 includes the head 14a sized to be inserted into the recess 13b of the terminal retainer 13 and a shaft 14b projecting from an upper surface of the head 14a and having a male thread at an outer peripheral surface. A lower surface of the head 14a includes a non-circular fitting recess (fitting groove) 14c, as described above. Accordingly, when the fitting projection 13c in the recess 13b fits in the fitting recess 14c, the terminal bolt 14 is insulated from the cover plate 3 and is supported on the terminal retainer 13 while the shaft 14b is restrained from rotating about its axis.

The connecting plate 15 is a rectangular conductive metal member made of a copper alloy or the like. A surface of the connecting plate 15 is plated with nickel for preventing rust, improving slipperiness, and other purposes. The connecting plate 15 includes a first through-hole 15a at one end and a second through-hole 15b at the other end. The second caulking part 12c of the rivet 12 is inserted into the first through-hole 15a. The shaft 14b of the terminal bolt 14 is inserted into the second through-hole 15b. An end portion of the second caulking part 12c of the rivet 12 which projects upward from the first through-hole 15a of the connecting plate 15 is caulked from above. With the caulking, the rivet 12 and connecting plate 15 are integrated.

Note that, in the terminal bolt 14, the shaft 14b is simply inserted into the second through-hole 15b of the connecting plate 15. However, for example, when a crimp contact of a lead wire of an external device (not shown) fits on the shaft 14b of the terminal bolt 14, and the shaft 14b of the terminal bolt 14 is fixed with a nut, the terminal bolt 14 is slightly lifted, and the upper surface of the head 14a comes into pressure contact with a lower surface of the connecting plate 15. This causes the crimp contact of the lead wire together with the connecting plate 15 to be held between the head 14a of the terminal bolt 14 and the nut. With this configuration, the crimp contact, terminal bolt 14, and connecting plate 15 are electrically connected to one another with reliability. Accordingly, the crimp contact of the lead wire is electrically connected to the electrode assembly 4 via the terminal bolt 14, connecting plate 15, rivet 12 and current collector 8 which are insulated from the cover plate 3 by the terminal retainer 13, outer gasket 11, and plastic plate 10. This causes the external device to be electrically connected to the battery cell.

Additionally, the fitting recess 14c of the head 14a of the terminal bolt 14 fitting on the fitting projection 13c in the recess 13b of the terminal retainer 13 fixed on the upper surface of the cover plate 3 reliably stops the terminal bolt 14 from rotating together with the nut when the nut is fixed to the shaft 14b of the terminal bolt 14. Even if there is some clearance between the fitting recess 14c of the head 14a of the terminal bolt 14 and the fitting projection 13c in the recess 13b of the terminal retainer 13, the terminal bolt 14 only rotates idly by a certain degree and poses no special problem.

At this time, since the terminal retainer 13 stops the terminal bolt 14 from rotating, the terminal retainer 13 receives rotational torque from the terminal bolt 14. However, the lower surface of the terminal retainer 13 with the glass fiber exposed is in intimate contact with the upper surface of the cover plate 3, and therefore the terminal retainer 13 is fixed with increased frictional resistance against the cover plate 3. Accordingly, the terminal retainer 13 is reliably stopped from rotating together with the terminal bolt 14 due to rotational torque from the terminal bolt 14. The second recess 3c of the upper surface of the cover plate 3 and the projection 13d at the lower surface of the terminal retainer 13 fitting in with each other make the rotation-stopping effect more remarkable. As described above, since adhesive means (e.g., an adhesive) is supplied to one of the upper surface (in particular, the second recess 3c) of the cover plate 3 and the lower surface of the terminal retainer 13, and the terminal retainer 13 is fixed to the cover plate 3 by the adhesive means, stopping of rotation is further ensured.

Note that if the perimeter of the shaft 14b (male thread part) of the terminal bolt 14 is smaller, i.e., the shaft 14b of the terminal bolt 14 has a smaller diameter, and a synthetic resin such as polyphenylene sulfide resin (PPS) is used alone as the material for the terminal retainer 13, the terminal retainer 13 may not withstand rotational torque from the terminal bolt 14. However, mixing of a synthetic resin with an inorganic fiber such as glass fiber enhances the strength of the terminal retainer 13. The mixing also contributes to cost reduction.

Since the terminal retainer 13 is provided separate from the outer gasket 11 at the cover plate 3, rotational torque is not transmitted to the outer gasket 11, which seals up a gap around the rivet 12. Accordingly, unintentional force is not applied to the outer gasket 11. Sealing with the outer gasket 11 (more specifically, sealing between the lower surface of the outer gasket 11 and the upper surface of the cover plate 3 (an upper surface of the first recess 3b), sealing between an outer peripheral surface of the annular projection 11d of the outer gasket 11 and an inner peripheral surface of the through-hole 3a of the cover plate 3 and an inner peripheral surface of the through-hole 10b of the plastic plate 10, and sealing between an inner peripheral surface of the annular projection 11d of the outer gasket 11 and an outer peripheral surface of the first caulking part 12b of the rivet 12) is not impaired.

Rotational torque applied to the shaft 14b of the terminal bolt 14 is not transmitted to the rivet 12, which is provided separate from the terminal bolt 14. Accordingly, a situation does not occur in which rotation of the rivet 12 causes the rivet 12 and the connection part 8a of the current collector 8 fixed by caulking to come loose to impair the connection therebetween. Additionally, unintentional force is not applied to the plastic plate 10 and outer gasket 11. Further, sealing with the plastic plate 10 and outer gasket 11 (more specifically, sealing between an upper surface of the plastic plate 10 and the lower surface of the cover plate 3, sealing between the lower surface of the outer gasket 11 and the upper surface of the cover plate 3 (the upper surface of the first recess 3b), sealing between the outer peripheral surface of the annular projection 11d of the outer gasket 11 and the inner peripheral surface of the through-hole 3a of the cover plate 3 and the inner peripheral surface of the through-hole 10b of the plastic plate 10, and sealing between the inner peripheral surface of the annular projection 11d of the outer gasket 11 and the outer peripheral surface of the first caulking part 12b of the rivet 12) is not impaired.

The separate provision of the outer gasket 11 and the terminal retainer 13 allows appropriate selection of a material with suitable hardness for a sealing member as the material for the outer gasket 11 and appropriate selection of a material with sufficient hardness to withstand rotational torque from the terminal bolt 14 as the material for the terminal retainer 13. More specifically, since the outer gasket 11 has a greater sealing effect when the outer gasket 11 deforms elastically to come into intimate contact with surfaces of the conductive members (the cover plate 3, current collector 8, and rivet 12), the outer gasket 11 is required to have a certain degree of flexibility. If the terminal retainer 13 is highly flexible, rotational torque from the terminal bolt 14 makes the fitting projection 13c likely to be worn and chipped. As the wear progresses, the rotation-stopping function of the terminal bolt 14 is impaired. For this reason, the terminal retainer 13 is required to have rigidity enough to withstand rotational torque from the terminal bolt 14.

In the rivet 12 according to the present embodiment, the dimension in an axial direction of the body 12a is set to be larger than that of a conventional one so as to minimize plastic deformation across the rivet 12 caused by caulking by the first caulking part 12b and second caulking part 12c. As a result, the position in height of the connecting plate 15 from the upper surface of the cover plate 3 is necessarily higher than that in a conventional terminal structure. The fitting projection 13c of the terminal retainer 13 according to the present embodiment is a part which directly receives rotational torque from the terminal bolt 14 when the terminal retainer 13 stops the terminal bolt 14 from rotating. Accordingly, the fitting projection 13c of the terminal retainer 13 needs to have a sufficient thickness in a direction of height so as to have strength enough to withstand rotational torque. As a result, the position in height of the head 14a of the terminal bolt 14 is high, and the position in height of the connecting plate 15 from the upper surface of the cover plate 3 is also necessarily higher than that in a conventional terminal structure. For this reason, in the present embodiment, the outer wall part 11a of the outer gasket 11 is high, and the creepage distance from the upper surface of the cover plate 3 to the upper end surface of the outer wall part 11a is long (the ratio of the creepage distance to the width dimension of the cover plate 3 is preferably 0.15 to 0.3). The outer wall part 13a of the terminal retainer 13 is high, and the creepage distance from the upper surface of the cover plate 3 to an upper end surface of the outer wall part 13a is long (the ratio of the creepage distance to the width dimension of the cover plate 3 is preferably 0.15 to 0.3).

More specifically, the outer wall part 11a of the outer gasket 11 is formed so as to entirely or substantially entirely cover the body 12a of the rivet 12 and such that the upper end surface of the outer wall part 11a is in contact with or is slightly spaced from the lower surface of the connecting plate 15. The outer wall part 13a of the terminal retainer 13 is formed so as to entirely or substantially entirely cover the head 14a of the terminal bolt 14 and such that the upper end surface of the outer wall part 13a is in contact with or is slightly spaced from the lower surface of the connecting plate 15.

With the above-described configuration, even if the battery cell is exposed to droplets of water generated by condensation or the like or a conductive atmosphere (static electricity or dust), the outer wall part 11a of the outer gasket 11 and the outer wall part 13a of the terminal retainer 13 serve as covers (or barriers). This conveniently prevents a short between the cover plate 3 and the rivet 12 and a short between the cover plate 3 and the terminal bolt 14.

The battery cell according to this embodiment is as described above. Because of the compression forming, the peripheral area of the portion through which the rivet 12 passes (the peripheral area of the through-hole 3a) in the cover plate 3 has a higher hardness than the remaining area as described above. This prevents the peripheral area of each through-hole 3a of the defining wall 3 from being elongated in a direction intersecting the direction of the compression even if the axial force caused by the caulking of the rivet 12 acts on the peripheral area. That is, while the peripheral area is subjected to the compressive force caused by the caulking of the rivet 12, the peripheral area has an increased stiffness through the work hardening associated with the compression forming. This suppresses the elongation of the peripheral area of each through-hole 3a in a direction intersecting the direction of the compression at the time of the caulking of the rivet 12. Thus, the peripheral area and the insulating members 10, 11 are brought into close contact with each other in a reliable manner, thereby ensuring seal of the case 2.

The compression forming of the peripheral areas of the through-holes 3a provides first recesses 3b in the outer surface of the cover plate 3, into which outer gaskets 11 are fitted. The inner peripheral surface of each first recess 3b and the outer peripheral surface of the outer wall part 11a of each outer gasket 11 face each other. This restricts the outer gasket 11 from easily being elongated in a direction orthogonal to the axial direction of the rivet 12 even if a compressive force caused by the caulking of each rivet 12 acts on the outer gasket 11.

In addition, since the outer gaskets 11 are made of synthetic resin, each outer gasket 11 undergoes creep deformation in the periphery of the through-hole 3a under the compressive force caused by the caulking of the rivet 12. That is, each outer gasket 11 is forced out with time in a direction orthogonal to the axial direction of the rivet 12 and becomes thinner, which could result in decreasing the degree of contact with the cover plate 3. However, the fitting of each outer gasket 11 into the first recess 3b as described above restricts the elongation in a direction orthogonal to the axial direction of the rivet 12. This prevents or reduces creep deformation so as to ensure close contact between each outer gasket 11 and the cover plate 3.

The case 1 is made up of the case body 2 having a box shape with an opening formed in one side and a cover plate 3 that covers the opening. The case body 2 and the cover plate 3 are made of an aluminum alloy, and the aluminum alloy used in the cover plate 3 is an annealed material. This makes it possible to reduce the overall weight of the battery cell. It is also possible to compression form the peripheral areas of the through-holes 3a and make them thinner without damaging (or breaking) the cover plate 3.

Specifically, an untreated (raw) aluminum alloy, a heat treated aluminum alloy or the like is harder than an annealed aluminum alloy (O-temper material). Because of this, when an untreated (raw) aluminum alloy, a heat treated aluminum alloy or the like is used, the peripheral areas of the through-holes 3a could be damaged (broken) at a location the edge of a mold contacts at the time of the compression forming. In particular, when the thickness is reduced for weight reduction, severe damage could occur. In contrast, an annealed aluminum alloy is softer than the above-mentioned materials. Because of this, an annealed aluminum alloy is plastically deformed in a smooth manner conforming to the mold when the peripheral areas of the through-holes 3a are compression formed. Thus, mechanical breakage is less likely to occur in the boundaries of the peripheral areas of the through-holes 3a, and it is therefore possible to ensure seal of case 1.

Note that an electric storage device according to the present invention is not limited to the above-described embodiment and that various changes may be made without departing from the spirit and scope of the present invention.

The above embodiment has also illustrated an example in which the entire lower surface of the outer gasket 11 fits in the first recess 3b in the upper surface of the cover plate 3. Alternatively, a projection may be formed at the lower surface of the outer gasket 11, the first recess of the cover plate 3 may be sized to receive the projection, and the projection of the outer gasket 11 may fit in the first recess, as with the case of the terminal retainer 13.

The above embodiment has also illustrated an example in which the projection 13d is formed in the lower surface of the terminal retainer 13, the second recess 3c sized to receive the projection 13d is formed in the upper surface of the cover plate 3, and the projection 13d of the terminal retainer 13 fits in the second recess 3c of the cover plate 3. Alternatively, the projection 13d may not be formed, the second recess of the cover plate 3 may be sized to receive the entire lower surface of the terminal retainer 13, and the entire lower surface of the terminal retainer 13 may fit in the second recess, as with the case of the outer gasket 11.

It is preferred, however, that the cover plate 3 have the first recess 3b and second recess 3c because they can increase the moment of area of the cover plate 3, which results in enhancement of the mechanical strength of the cover plate 3. In this case, reducing the size of one of the first recess 3b and the second recess 3c increases the distance between the first recess 3b and the second recess 3c. This prevents the first recess 3*b* and second recess 3*c* from affecting each other. The above embodiment has illustrated an example in which the first recess 3*b* for the outer gasket 11 is larger than the second recess 3*c* for the terminal retainer 13. This configuration is adopted on the ground that the flatness and mechanical strength of the cover plate 3 increase with an increase in the area of the first recess 3*b*, which results in an increase in sealing effect and durability.

For either the outer gasket 11 or the terminal retainer 13, the number of projections is not limited to one, and a plurality of projections may be formed. The outer gasket 11 and terminal retainer 13 need not be rectangular. For example, the outer gasket 11 and terminal retainer 13 may be circular, hexagonal, or octagonal.

The above embodiment has illustrated an example in which the current collector 8 for the positive electrode and the rivet 12 for the positive electrode are made of aluminum or an aluminum alloy while the current collector 8 for the negative electrode and the rivet 12 for the negative electrode are made of copper or a copper alloy. However, any materials may be used as long as the materials are conductive metal materials appropriate to the type of a battery cell. The above embodiment has also illustrated the materials for the terminal bolt 14 and connecting plate 15. However, any materials may be used as long as the materials are conductive metal materials whose properties such as strength and conductivity are appropriate.

The above embodiment has illustrated an example in which the shaft (male thread part) 14*b* projects from the upper surface of the head 14*a* of the terminal bolt 14. However, a shaft in an appropriate form such as a circular or polygonal tube may project instead of the male thread part, and a threaded hole may be formed in an upper end surface of the shaft.

The electrode assembly is not limited to one of the winding type in the form of an elliptic cylinder as described in the above embodiment. The electrode assembly may have any other shape and may be one of the stacking type.

The above embodiment was described by taking, for example, the case in which an annealed aluminum alloy (O-temper material) is used for the cover plate 3 on the premise that the terminal structure 9 is arranged on the cover plate 3. However, the present invention is not limited to this. For example, when an aluminum alloy is used, an untreated aluminum alloy (F-temper material) or a heat treated aluminum alloy other than the above (T-temper material) may be used. Alternatively, a work-hardened aluminum alloy (H-temper material) may be used. This is because the work hardening can be further progressed by the compression forming. Furthermore, the material for the case 1 is not limited to an aluminum alloy. For example, the case 1 may be made of other metallic materials such as a stainless alloy and the like.

The above embodiment was described by taking, for example, the case in which the terminal structure 9 is arranged on the cover plate 3, but alternatively the terminal structure 9 may be arranged on the case body 2. That is, the rivet 12 may extend through the case body 2. In this instance too, an O-temper material may preferably be used for the case body 2. As will be understood, the case body 2 may be made of other aluminum alloys than an O-temper aluminum alloy or other metallic materials.

In the above embodiment, the first recesses 3*b* are formed in the outer surface of the cover plate 3, but the present invention is not limited to this. For example, a recess may be formed in the inner surface of the cover plate 3, or alternatively the cover plate 3 may have recesses on both sides. Specifically, it is preferred that the recesses 3*b* be formed in the outer surface of the cover plate 3, for the positioning of the outer gaskets 11 or for the restriction of the elongation of the outer gaskets 11 or the like. In the meantime, for the positioning of the plastic plate 10 or the restriction of the elongation of the plastic plate 10, a recess may be formed in the inner surface of the cover plate 3 to fittingly receive the plastic plate 10. In the case in which the positioning or the restriction of the elongation is performed for both the outer gasket 11 and the plastic plate 10, the cover plate 3 may have recesses on both sides.

In the above embodiment, both ends of the rivet 12 are caulked, but the present invention is not limited to this. For example, either one end of the rivet 12 may be caulked.

In the above embodiment, the rivet 12 and the terminal bolt 14 are separate components, which are electrically connected to each other via the connection plate 15. However, the present invention is not limited to this. For example, the rivet 12 and the terminal bolt 14 may be integrally formed. In such a case, the rivet 12 may have a flange part having a diameter larger than that of the body part 12*a* in place of one of the caulking parts (the second caulking part) 12*c* of the body part 12*a* of the rivet 12, and the terminal bolt 14 may be integrally formed to the flange part. This configuration allows the outer gasket 11, the cover plate 3, the plastic plate 10 and the connection part 8*a* of the current collector 8 to be integrally fastened through the first caulking part 12*b* and the flange part by caulking the first caulking part 12*b*. Also, with this configuration, it is possible to electrically connect the terminal bolt 14 to the electrode assembly 4.

In the above embodiment, the outer gasket 11 and the terminal retainer 13 are separately arranged on the outer surface of the cover plate 3, but the present invention is not limited to this. For example, the outer gasket 11 and the terminal retainer 13 may be integrally formed.

In the above embodiment, the outer gasket 11 has an annular projecting portion 11*d* that is fitted into the through-hole 3*a* of the cover plate 3, but the present invention is not limited to this. For example, the plastic plate 10 may have an annular projecting portion that can be fitted into the through-hole 3*a* of the cover plate 3. Alternatively, the outer gasket 11 and the plastic plate 10 may each have an annular projecting portion that can be fitted into the through-hole 3*a* of the cover plate 3.

In the above embodiment, the terminal retainer 13, the outer gasket 11 and the plastic plate 10 are each made of a material having insulating properties to provide insulation between the terminal bolt 14 and the cover plate 3. However, the present invention is not limited to this. For example, when the defining wall of the case 1 and the electrode assembly 14 are electrically connected to each other via the rivet 12, the terminal retainer 13, the outer gasket 11, or the plastic plate 10 may have electrical conductivity. As a method to give electrical conductivity to the terminal retainer 13, the outer gasket 11, or the plastic plate 10, a material having electrical conductivity such as carbon may be mixed with synthetic resin. Alternatively, the outer gasket 11 and the plastic plate 10 may not be provided, and the rivet 12 and the cover plate may be in direct contact with each other.

The above embodiment has been described in the context of a lithium ion secondary battery cell. However, the type and size (capacity) of a battery cell may be arbitrarily selected.

The present invention is not limited to lithium ion secondary battery cells and can also be applied to various secondary battery cells, primary battery cells, and capacitors such as an electric double layer capacitor.

The invention claimed is:
1. An electric storage device, comprising:
an electrode assembly;

a case that houses the electrode assembly, the case including a defining wall; and a rivet that passes through the defining wall, wherein, in the defining wall, a peripheral area of a portion in the defining wall through which the rivet passes has a higher hardness than a remaining area of the defining wall, wherein the peripheral area comprises an area compressed in a thickness direction of the defining wall such that the compressed area has a higher hardness than the remaining area of the defining wall, the area compressed thereby being thinner than the remaining area of the defining wall.

2. The electric storage device according to claim 1, further comprising:

an insulating member disposed along the defining wall, the insulating member comprising a joining surface that faces the defining wall, so that the rivet passes through the insulating member and the defining wall, wherein the defining wall comprises a recess into which a portion of the joining surface of the insulating member is fittable.

3. The electric storage device according to claim 2, wherein the insulating member comprises a synthetic resin.

4. The electric storage device according to claim 2, wherein the insulating member is disposed on an outer surface of the defining wall and supports the rivet.

5. The electric storage device according to claim 1, further comprising:

an outer insulating member disposed on an outer surface of the defining wall, the outer insulating member comprising a joining surface that faces the outer surface of the defining wall; and an inner insulating member disposed on an inner surface of the defining wall, the inner insulating member comprising a joining surface that faces the inner surface of the defining wall, so that the rivet passes through the outer insulating member, the defining wall, and the inner insulating member, wherein the defining wall comprises a recess into which a portion of the joining surface of at least one of the outer and inner insulating members is fittable.

6. The electric storage device according to claim 1, wherein the defining wall comprises a first through-hole in a portion thereof, wherein the rivet passes through the defining wall via the first through-hole, and wherein the peripheral area of the first through-hole in the defining wall has a higher hardness than the remaining area.

7. The electric storage device according to claim 6, further comprising:

an insulating member disposed along the defining wall, the insulating member comprising a second through-hole that corresponds in position to the first through-hole of the defining wall and a joining surface that faces the defining wall with the first and second through-holes aligned with each other, so that the rivet passes through the insulating member and the defining wall via the first and second through-holes, wherein the defining wall comprises a recess into which a portion of the joining surface of the insulating member is fittable.

8. The electric storage device according to claim 7, wherein the insulating member comprises a synthetic resin.

9. The electric storage device according to claim 7, wherein the insulating member is disposed on an outer surface of the defining wall and supports the rivet.

10. The electric storage device according to claim 6, further comprising:

an outer insulating member disposed on an outer surface of the defining wall, the outer insulating member comprising a third through-hole that corresponds in position to the first through-hole of the defining wall and a joining surface that faces the outer surface of the defining wall with the first and third through-holes aligned with each other; and an inner insulating member disposed on an inner surface of the defining wall, the inner insulating member comprising a fourth through-hole that corresponds in position to the first through-hole of the defining wall and a joining surface that faces the inner surface of the defining wall with the first and fourth through-holes aligned with each other, so that the rivet passes through the outer insulating member, the defining wall and the inner insulating member via the first, third and fourth through-holes, wherein the defining wall comprises a recess into which a portion of the joining surface of at least one of the outer and inner insulating members is fittable.

11. The electric storage device according to claim 1, wherein the defining wall comprises an annealed aluminum alloy.

12. The electric storage device according to claim 4, further comprising:

a terminal retainer disposed on the outer surface of the defining wall, the terminal retainer comprising a joining surface that faces the outer surface of the defining wall; and an external terminal that is supported by the retainer and electrically connected to the rivet, wherein the defining wall comprises a recess into which a portion of the joining surface of the terminal retainer is fittable.

13. The electric storage device according to claim 12, wherein the insulating member and the retainer are disposed proximate to each other.

14. The electric storage device according to claim 1, wherein the case further includes a case body comprising an opening and a cover plate that covers and seals the opening of the case body, and wherein the rivet passes through the cover plate that constitutes a part of the defining wall of the case.

15. The electric storage device according to claim 14, wherein the case body has a rectangular box shape that is flat in the width direction, and wherein the cover plate a rectangular plate that corresponds in position to the opening of the case body.

16. The electric storage device according to claim 1, wherein the defining wall seals the case.

17. The electric storage device according to claim 1, wherein the peripheral area of the portion comprises an area of the defining wall in a vicinity of the rivet.

18. The electric storage device according to claim 1, wherein, in a plan view, the peripheral area is larger than an area of the rivet.

19. The electric storage device according to claim 1, wherein the peripheral area comprises a recess that extends from an upper surface of the defining wall in a thickness direction of the defining wall to form an indentation in the defining wall.

* * * * *